May 8, 1962 P. J. ERNISSE ETAL 3,033,092
PHOTOGRAPHIC SHUTTER
Filed April 21, 1960

Paul J. Ernisse
William H. Horton
INVENTORS

BY R. Frank Smith
Karl T. Naramor
ATTORNEYS

United States Patent Office 3,033,092
Patented May 8, 1962

3,033,092
PHOTOGRAPHIC SHUTTER
Paul J. Ernisse and William H. Horton, Rochester, N.Y., assignors to Eastman Kodak Company, Rochester, N.Y., a corporation of New Jersey
Filed Apr. 21, 1960, Ser. No. 23,729
7 Claims. (Cl. 95—59)

The present invention relates to photography, and particularly to shutters for photographic cameras.

In inexpensive camera shutters it is quite difficult to obtain a multiple speed range because if a strong enough spring is used to produce a fast shutter speed then it becomes very difficult to obtain an instantaneous speed which is sufficiently slow, i.e., $\frac{1}{25}$ second. In the past attempts have been made to use a strong driving spring which will produce the desired high speed and then introduce a retard device to obtain the slower speeds.

The primary object of the present invention is to provide an inexpensive, multiple speed, behind or between the lens shutter, which is capable of speeds in the range of $\frac{1}{25}$ to and including $\frac{1}{250}$ second.

Another object is to provide a shutter of the type described which is one of the impact or inertia type and may be either one of the self-setting type (automatic) or one of the setting type which may be manually cocked or cocked by the action of the film advance mechanism as is well known in the art.

And another object is to provide a shutter of the type described which comprises a pivoted single blade which is adapted to be struck and moved from a normally closed position in which it covers the exposure aperture to its fully open position by a spring actuated impact lever as determined by an adjustable rebound stop. The time which the shutter blade remains in its open position is determined by the position of the rebound stop and the action of an inertia member which is so connected to the shutter blade as to be set into oscillating movement with the blade but which is capable of movement relative to the blade.

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawings in which:

Generally speaking, the shutter of the present invention, which may be self-setting or may be reset manually or by action of a film advance mechanism as is well known, comprises a pivoted single blade which is adapted to be struck and moved to a shutter open position by a spring actuated impact lever when the latter is released by a trigger. The impact lever disengages the shutter blade before the blade reaches its full open position, which is determined by an adjustable rebound stop which the blade ultimately comes to rest against. Associated with the shutter blade is an inertia member in the form of a leaf spring having a weight attached to its free end and having its other end associated with the shutter blade so as to be moved about the same pivot point as the blade when the latter is struck by the impact lever. This inertia member acts to hold the shutter blade in its full open position for a given time by reason of the fact that after the shutter blade reaches its rebound stop the inertia member continues to swing until its kinetic energy content is dissipated and thus hold the shutter against its stop. When the inertia member has dissipated all of its energy content it will reverse its direction and aid a shutter return spring in returning the shutter to its closed position where it is snubbed to prevent rebound. Speeds up to $\frac{1}{100}$ second can be easily obtained by merely adjusting the position of the rebound stop relative to the path of movement of the shutter blade. Speeds above $\frac{1}{100}$ second can be obtained by stopping the blade at its shortest travel and selectively sliding a stop pin into the path of the inertia member to stop it before the blade is stopped, or into the path of both the inertia member and the shutter blade to stop the two simultaneously.

Figure 1:
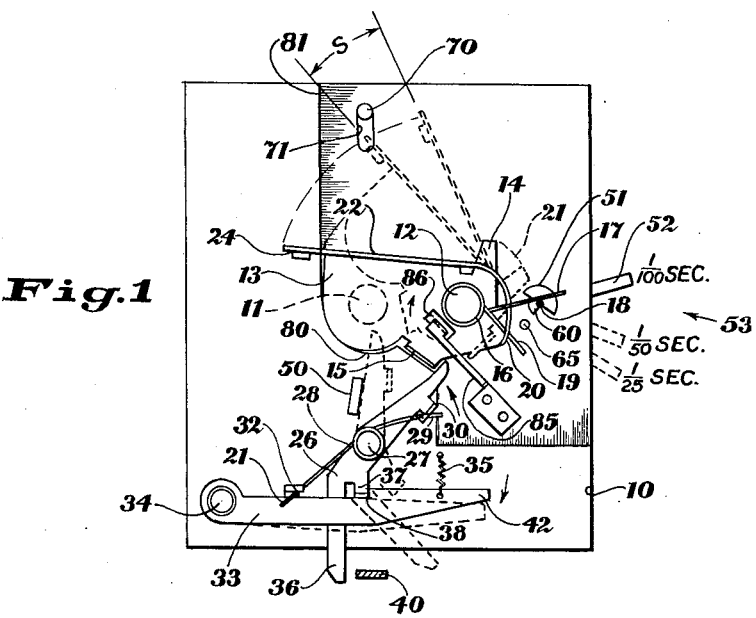
FIG. 1 is a plan view of a shutter constructed in accordance with a preferred embodiment of the present invention, and showing in full lines all parts in their normal position of rest and in broken lines the position of the shutter blade and inertia member when the shutter is open and set for an exposure speed of $\frac{1}{100}$ second.
Figure 2:
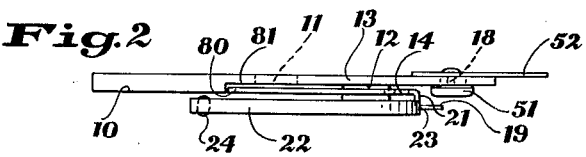
FIG. 2 is a side elevational view of the shutter shown in FIG. 1 and looking down on the side of the shutter which is at the top in FIG. 1.

Referring now to FIGS. 1 and 2, wherein a shutter constructed in accordance with a preferred embodiment of the present invention is shown, all moving parts of the shutter are shown in solid lines in their position of rest which they normally assume after the shutter is cocked and before an exposure is made. The broken line positions of the shutter blade and inertia member shown are those which these parts assume when the shutter is open and is set for $\frac{1}{100}$ second exposure. All arrows in FIG. 1 show the direction that the parts travel during the opening cycle of the shutter.

This shutter comprises a supporting plate 10, preferably made of a plastic or other electrical insulating material, which has an exposure aperture 11 extending therethrough which will be in alignment with the camera objective, not shown, when the plate 10 is mounted in known fashion to the front of a camera body, not shown. Pivotally mounted on a stud 12 extending from the supporting plate 10 is a shutter blade 13, which is adapted to oscillate between a closed position, shown in solid lines in FIG. 1, wherein it covers the exposure aperture 11, and an open position, shown in dotted lines, wherein it uncovers said aperture. As is well know, the time the blade remains in its open position before returning to its closed position determines the exposure time. While we have shown a solid shutter blade, which is moved to and from covering relation with the exposure aperture 11, it will be understood that this blade could be one of the known type which has an arcuate opening therein, which is moved to and from alignment with the exposure aperture to make an exposure, and when a shutter blade is referred to in this specification and the claims at the end thereof it is meant to cover such a shutter blade modification.

The blade 13 has formed integrally therewith a stop arm 14 which lies in the plane of the blade and extends substantially radially of the blade pivot 12. The blade is also provided with an upstanding drive lug 15 which is on the opposite side of the blade pivot from the stop arm 14. The shutter blade is normally moved to its closed position by a light return spring 16 wrapped around the pivot stud 12 and having one end 17 lying against a control cam stud 18 extending through the supporting plate 10 and the other end 19 engaging a notch 20 is an upturned wall 21 on the shutter blade.

An inertia member in the form of a spring arm 22 is fixed at one end 23, see FIG. 2, to the blade and has its free end offset from the plane of the blade so that it is free to swing relative to the blade substantially about the pivot stud 12. In the preferred embodiment, this inertia arm 22 is formed integrally with the blade by being stamped out of the same piece of thin metal as the blade and being physically attached to the upturned wall 21 so as to lie in a plane perpendicular to that of the blade proper when this wall 21 is turned up, see FIG. 2. Fixed to the free end of inertia arm 22 is a weight or mass 24.

The driving mechanism for this shutter blade 13 comprises a drive lever 26 pivoted on stud 27 and loaded by a drive spring 28, which is wrapped around the stud 27 and has one end 29 engaging a lug 30 on the drive lever and has its other end 31 anchored by a lug 32 struck up from latch lever 33 pivoted at 34 to the supporting plate 10 and normally moved to the latching position shown in solid lines in FIG. 1 by a spring indicated at 35. The shutter can be cocked either manually or by the film advancing mechanism of a camera, as is well known, by engaging the setting arm 36 on the drive lever 26 and moving it to the left, looking at FIG. 1, until the latch arm 37 on the drive lever drops behind the latching notch 38 in the latch lever 33. This moves the drive lever clockwise about its pivot 27 and tensions the drive spring 28, and this setting action can be accomplished by a lever 40, which is movably connected to the camera body of which this shutter is to form a part, and arranged so as to be moved manually or by the film advancing mechanism. In order to permit the drive lever 26 to be moved to a cocked or latch position after the shutter blade 13 is reclosed the edge of the driving lug 15 on the shutter blade 13 is made in the form of an inclined ramp to permit the end of lever 26 to move up and over the same during cocking of the shutter as is well known in the art. It is further pointed out that while we have shown our shutter as one of the setting type it could just as well be one of the automatic or self-setting type wherein the drive spring is cocked by the initial movement of the trigger and is then released as the trigger slips off the setting member, all as is well known in the shutter art.

Having set forth the essential parts of the shutter mechanism its operation will now be described. Assuming the parts to be in the position shown in full lines in FIG. 1, wherein the shutter is in a cocked condition, the exposure is made by pressing on the end 42 of the latch lever 33, or trigger, down in the direction of the arrow to the dotted line position. This actuation of the trigger causes the latching notch 38 of the latch lever to clear the latch arm 37 on the drive lever 26. The drive lever is now free to rotate in a counterclockwise direction about its pivot stud 27 under the action of the relatively strong drive spring 28. At the start of rotation the end of the drive lever strikes the drive lug 15 on the blade 13 a sharp blow causing the blade to rotate in a counterclockwise direction, as shown by the arrow, about the blade pivot stud 12. The drive lever 26 continues to drive the shutter blade 13 until the latter is clear of the exposure aperture 11. At this point the end of the drive lever leaves the shutter blade drive lug 15 and continues on until it comes to rest against a stop 50 fixed to the supporting plate 10. The shutter blade 13 continues to rotate until it is stopped by stop arm 14 thereon engaging a speed control cam 51, which is fixed to stud 18 and can be turned by a speed adjusting lever 52, which is movable over a speed scale 53 arranged on an accessible part of the camera. The inertia arm 22, however, is unhampered by a stop and continues on swinging through a pendulum-like arc (angle S in broken lines). The kinetic energy content of inertia arm 22 is considerably greater than the torque required to "wind up" the blade return spring 16 so that the flexing (angle S) of the inertia arm overcomes the blade return spring and holds the blade against the control cam 51, in which position the blade is open, until the energy content of the inertia arm has been dissipated and it reverses its direction. This period of dwell during which the inertia member holds the shutter against the control cam is an interruption between the opening and closing cycles of the blade, and therefore, results in a definite shutter open interval.

Moving the speed control cam to the 1/50 second position, see FIG. 1, brings the smaller control cam 60 into the path of stop arm 14 and increases the angular travel of the shutter blade prior to its stop arm 14 coming to rest against the control cam. This difference in angular travel results in a slight change in the angular velocity of the blade at the moment of impact with the control cam. This slight change of velocity plus the extended, or shortened, blade travel as the case may be, causes a change in the dwell period of the blade in its open position and results in different shutter speeds for different settings of the speed control cam. By setting the speed control lever to the 1/25 second speed the control cam is turned so that both cams 51 and 60 thereon are out of the path of the stop arm 14 and the blade then moves until it comes to rest against a fixed stop pin 65, which is so positioned as to allow a dwell in the open time of the shutter to produce this slow speed. Or, if the strength of the return spring 16 and the mass of the inertia arm are properly chosen, then no stop pin 65 is needed for this 1/25 second speed, but the shutter is allowed to move freely until the energy content of the inertia member is dissipated and is overcome by the return spring 16 to close the shutter.

Figure 3:
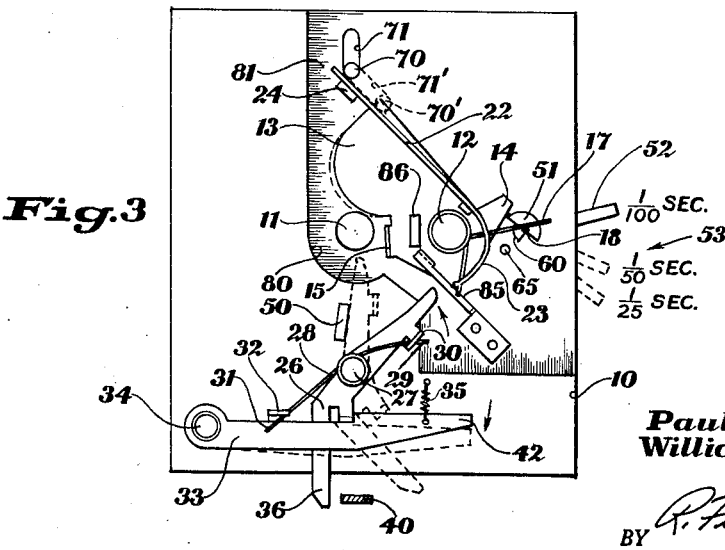
FIG. 3 shows the position of the shutter blade and inertia member when the shutter is open and set for an exposure speed over $\frac{1}{100}$ second.

When speeds faster than 1/100 second are desired it is necessary to stop the inertia arm 22 and/or the blade and inertia arm in a manner depicted in FIG. 3. To obtain a 1/200 second shutter speed the control cam is set at its 1/100 second position and a stop pin 70 is slid from the upper end of a slot 71 in the supporting plate 10 to the bottom of the slot as shown in FIG. 3. The shutter blade is set into motion exactly as before but now the inertia arm 22 is stopped by pin 70 just before the shutter blade 13 is stopped by stop arm 14 engaging the control cam 51. The shutter blade 13 continues to move relative to the stopped inertia arm due to its kinetic energy and causes the inertia arm to fix until the stop arm 14 of the blade comes into contact with control cam 51. At this instant both the inertia arm and the blade return spring 16 are flexed and the combined moment of the two will cause the blade to quickly reverse to its closed position relative to the exposure aperture 11. This action results in a very short dwell period and therefore a short exposure time. As indicated in FIG. 1, for shutter speeds from 1/25 to 1/100 second the stop pin 70 should be moved to the top end of the slot 71. It will be apparent that some suitable means, not shown, would be provided to detent or frictionally restrain the pin 70 in each of its adjusted positions within slot 71 so that it will remain in any adjusted position against accidental displacement.

A still faster shutter speed, i.e., 1/250 second, can be obtained by moving stop pin 70 further down to the position shown in dotted lines in FIG. 3 wherein it engages and stops both the inertia arm 22 and shutter blade 13 at the same time and just after the blade has completely uncovered the exposure aperture 11. Under these conditions no relative movement between the blade and the inertia arm is permitted and the open dwell time of the shutter is reduced to the absolute minimum. To allow this latter adjustment of stop pin 70, the slot 71 may be extended at an angle as indicated at 71' in FIG. 3 and the stop pin will be moved to the dotted line position at the lower end of the angular slot as indicated at 70'.

While different arrangements may be used to eliminate, or reduce to a minimum, a rebound of the shutter blade as it is returned to its closed position, we have shown this accomplished by a curved stop wall 80, which is adapted to engage the edge of the circular portion of the shutter blade 13 as it returns to its closed position in such a way as to impart a snubbing action to the blade. This curved wall 80 is formed by recessing the upper right-hand corner of the supporting plate 10 as indicated at 81 and mounting the shutter blade 13 in this recessed portion, see FIGS. 2 and 3.

The weight or mass 24 attached to the free end of inertia arm 22 is a means for "tuning up" or adapting this shutter to various speed combinations. Removing it, or changing its mass, has a marked effect on the dwell period of the shutter blade and hence the resulting shutter speed.

This shutter may be provided with a flash switch comprising a resilient flash contact 85, the turned-down end of which projects through a hole 36 in the shutter blade 13 and rests on the insulating supporting plate 10 at the underside of the blade when the shutter is closed. The shutter blade itself serves as the other switch contact. When the blade 13 is actuated the edge of the hole 86 comes into contact with a ramp on the turned-down end of a contact 85 which then rides on the top surface of the blade and closes the flash circuit, see FIG. 3. This type of contact is very desirable since the actuation of the shutter tends to keep the contact surfaces clean and free of corrosion or other foreign material.

If this shutter mechanism is to be used as a self-energized or automatic shutter, it will be necessary to add another lever-spring combination in order to relatch the shutter drive lever 26. Since there are several proven methods for accomplishing this no disclosure of a structure for this purpose is disclosed herein. However, a disclosure of one appropriate structure for this purpose is shown in U.S. patent application Serial No. 787,483, C. Fuerst, filed January 19, 1959, now U.S. Patent 2,952,198, which issued September 13, 1960.

While we have shown the shutter blade 13 and the inertia member 22 formed from a single piece of metal it is pointed out that such a construction is only preferred because of its simplicity and inexpensive fabrication and assembly and the invention is not limited to such a specific arrangement of parts. For example, the shutter blade and inertia member could be completely separate parts oscillatably mounted in superposed relation about the same or separate pivot points, each having their own light return springs and being arranged to be put into movement from a normal rest position at the same time by one or separate impact driving means. Then if the shutter blade and inertia member are interconnected by any suitable means, i.e., a spring connection which will permit the inertia member to move relative to the shutter blade and hold the latter in an open position for a given dwell time dependent upon its energy content, then the desired result will be obtained.

Although we have shown and described certain specific embodiments of our invention we are aware that many modifications thereof are possible. Our invention, therefore, is not to be limited to the specific details shown and described, but is intended to cover all modifications coming within the scope of the appended claims.

Having thus disclosed our invention, what we claim is new and novel and desire to secure by Letters Patent of the United States is:

1. In a photographic shutter the combination with a support provided with an exposure aperture; a shutter blade pivotally mounted on said support to oscillate between a closed position, wherein it is in covering relation with said exposure aperture, and an open position, wherein it uncovers said exposure aperture; a return spring for urging said shutter blade from said open position to said closed position; means for applying a sharp impact to said blade to move it from its closed position; a rebound stop in the path of movement of said blade and adjustable in the direction of movement of said blade to alter the open time of said blade; of an inertia member mounted on said support to oscillate over a given path to and from a normal position of rest; means for applying a sharp impact to said inertia member to move it from its rest position at the same time said shutter blade is moved from its closed position; and means for connecting said inertia member and said shutter blade together so as to allow said inertia member to move after said shutter blade is stopped by said rebound stop and during such movement to momentarily hold said blade in its open position against the action of said return spring until the kinetic energy content of said inertia member is dissipated and after which said inertia member is allowed to return to its normal position of rest and said shutter is returned to its closed position by its return spring.

2. A photographic shutter according to claim 1 wherein the connecting means between said inertia member and said shutter blade is a spring connection.

3. In a photographic shutter the combination with a support provided with an exposure aperture; a shutter blade pivotally mounted on said support to oscillate between a closed position, wherein it is in covering relation with said exposure aperture, and an open position, wherein it uncovers said exposure aperture; a return spring for urging said shutter blade from said open position to said closed position; of an inertia member mounted on said support to oscillate about the same center as said shutter blade over a given path to and from a normal position of rest; means for directly connecting said inertia member to said shutter blade whereby the oscillation of one part sets up a corresponding oscillation in the other part while at the same time allowing one part to move relative to the other when moving in the same direction; means for applying a sharp impact to said shutter blade to move it from its closed position and move said inertia member from its rest position; a rebound stop in the path of movement of said shutter blade adapted to engage and limit the opening movement of said shutter blade while permitting said inertia member to move relative to said blade and hold said blade in an open position by virtue of said relative movement until the kinetic energy content of said inertia member is dissipated whereupon the shutter blade is allowed to return to its closed position and the inertia member is returned to its rest position by the action of said return spring.

4. A photographic shutter according to claim 3 in which said rebound stop is adjustable in the direction of movement of said shutter blade to alter the open time of said shutter.

5. In a photographic shutter the combination with a support provided with an exposure aperture; a shutter blade pivotally mounted on said support to oscillate between a closed position, wherein it is in covering relation with said exposure aperture, and an open position, wherein it uncovers said exposure aperture; a return spring for urging said shutter blade from said open position to said closed position; of an inertia member mounted on said support to oscillate about the same center as said shutter blade over a given path to and from a normal position of rest; means for connecting said inertia member to said shutter blade whereby the oscillation of one part sets up a corresponding oscillation in the other part while at the same time allowing one part to move relative to the other when moving in the same direction; means for applying a sharp impact to said shutter blade to move it from its closed position and move said inertia member from its rest position; a rebound stop in the path of movement of said inertia member adapted to engage and limit the movement of said inertia member from its rest position while permitting said shutter blade to move relative to said inertia member by virtue of the connection between the two whereupon the shutter blade is allowed to return to its closed position and the inertia member to its rest position by the action of said return spring.

6. A photographic shutter according to claim 3 and including a second rebound stop selectively movable into and out of an operative position in which it engages said inertia member and limits its movement away from its rest position before said blade engages said first rebound stop to produce a shorter shutter open time.

7. A photographic shutter according to claim 3 and including a second rebound stop selectively movable into and out of a first operative position in which it engages said inertia member to limit its movement away from its rest position before said blade engages said first rebound stop to produce a shorter shutter open time, and a second operative position in which it engages said inertia member and shutter blade simultaneously and before said blade engages said first rebound stop to produce a still shorter shutter open time.

References Cited in the file of this patent
UNITED STATES PATENTS

| | | |
|---|---|---|
| 1,966,313 | Riddell | July 10, 1934 |
| 2,887,938 | Nassour | May 26, 1959 |